J. L. FRICK & H. G. CLEMENGER.
MOTOR TRACTION CAR.
APPLICATION FILED DEC. 17, 1917.
1,272,935.
Patented July 16, 1918.
3 SHEETS—SHEET 3.
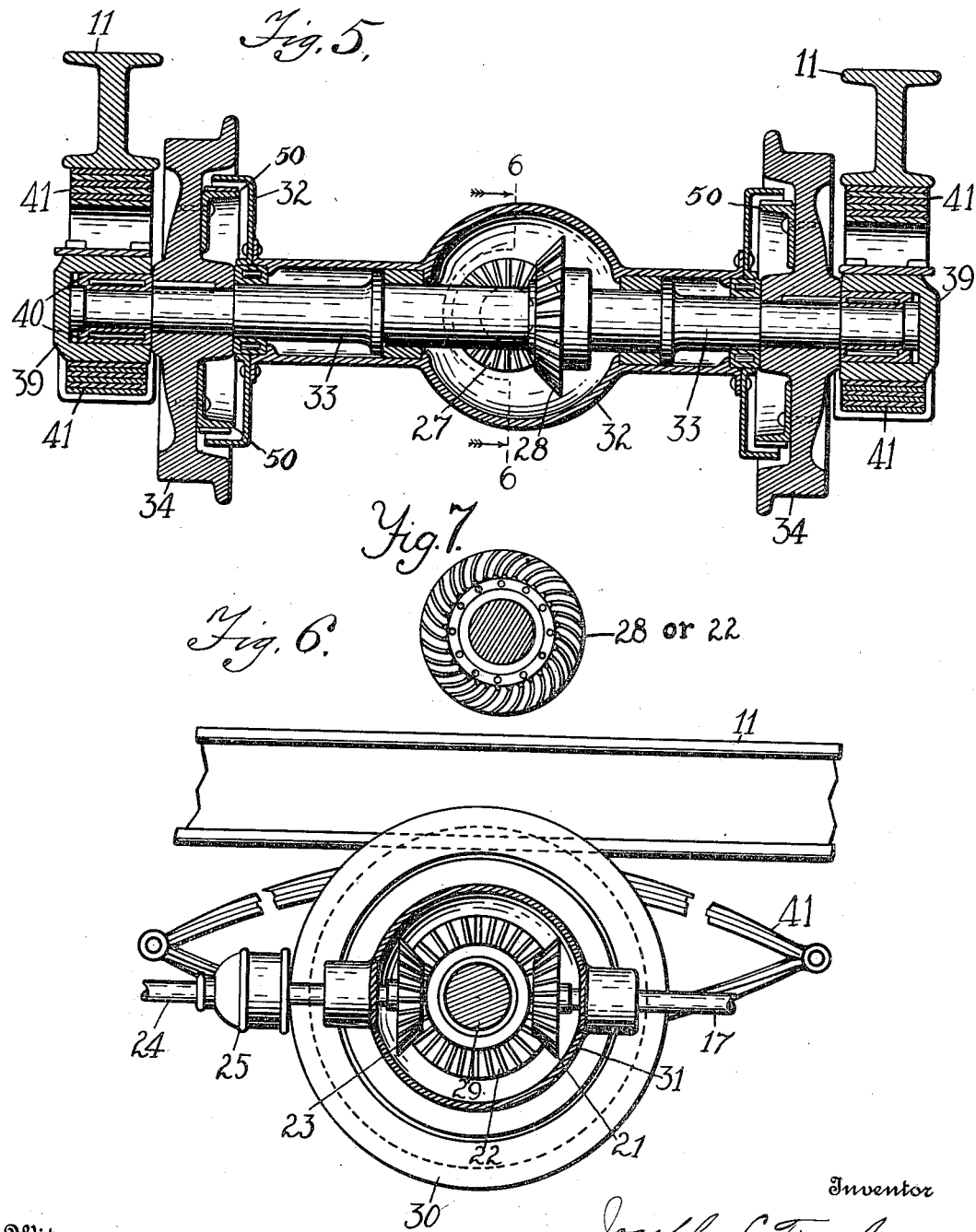

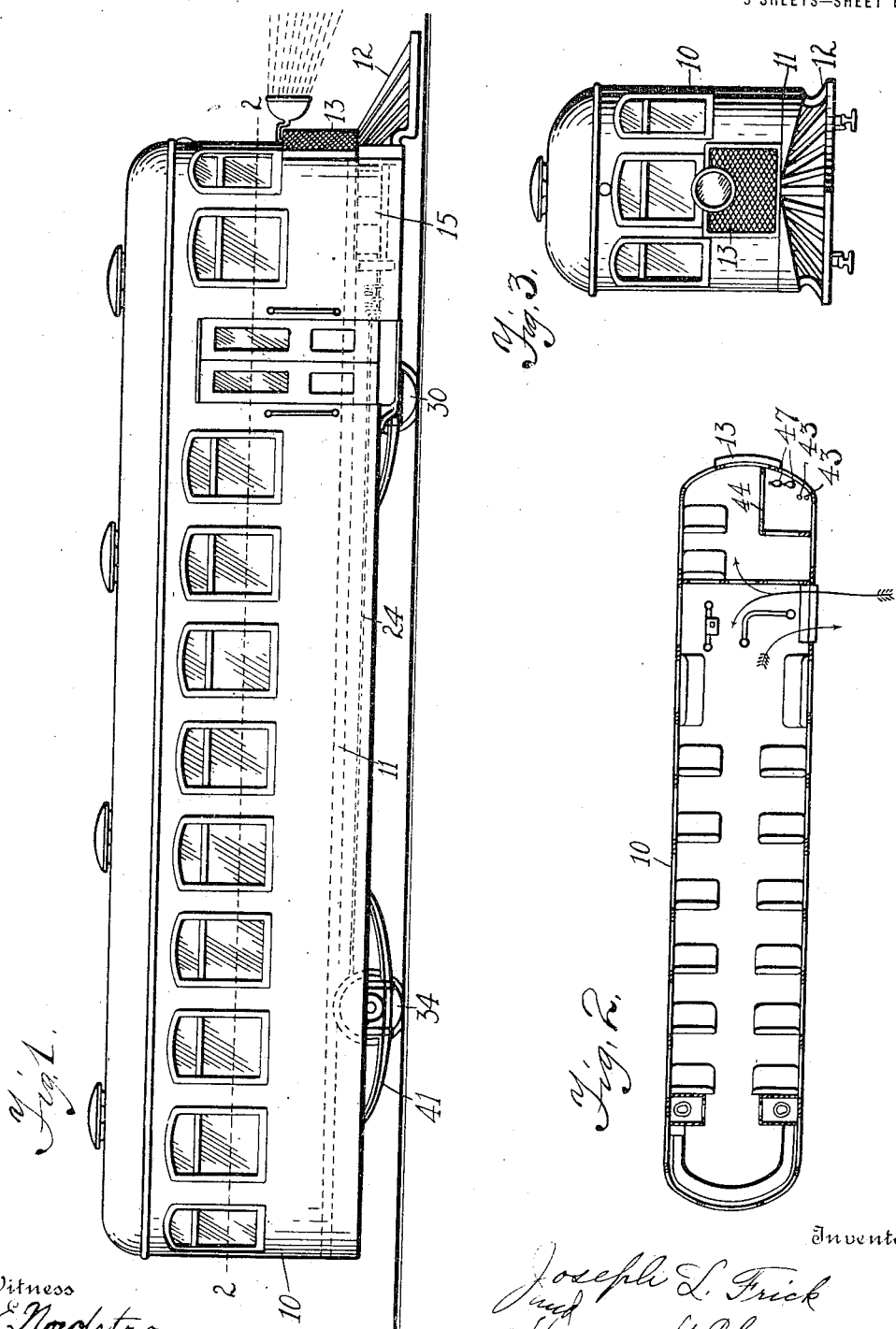

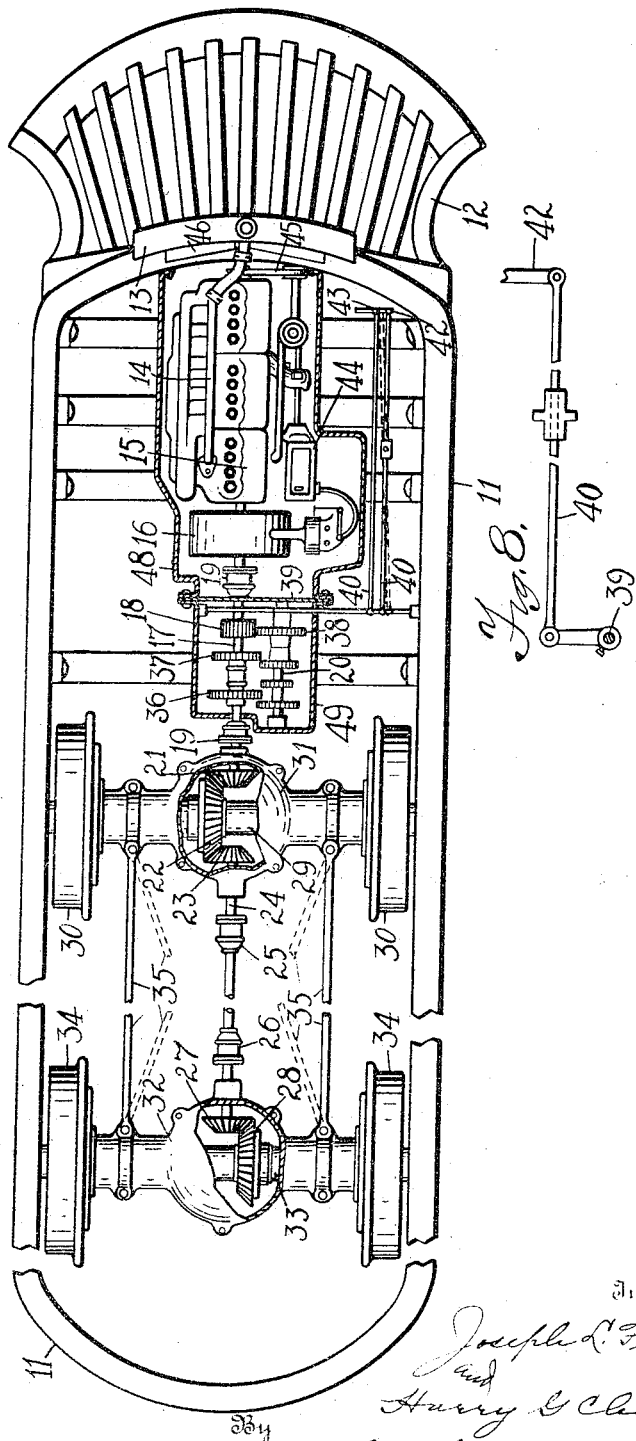

UNITED STATES PATENT OFFICE.

JOSEPH L. FRICK AND HARRY G. CLEMENGER, OF JAMESTOWN, NEW YORK.

MOTOR TRACTION-CAR.

1,272,935.

Specification of Letters Patent.   Patented July 16, 1918.

Application filed December 17, 1917.   Serial No. 207,455.

*To all whom it may concern:*

Be it known that we, JOSEPH L. FRICK and HARRY G. CLEMENGER, citizens of the United States, residing at the city of Jamestown, in the county of Chautauqua and State of New York, have invented certain new and useful Improvements in Motor Traction-Cars, of which the following, taken in connection with the accompanying drawings, is a specification.

The invention relates to power transmission and control mechanism on rail vehicles; and the object of the improvement is to provide a simple and direct drive mechanism for both the forward and rear axles so that a traction car or rail vehicle may be driven on a railway substantially the same as an automobile on a roadway; and the invention consists in the novel features and combinations hereinafter set forth and claimed.

In the drawings, Figure 1 is a side elevation of a traction car having our improved driving mechanism. Fig. 2 is a sectional view through the body of the car at line 2—2 in Fig. 1, showing the preferred arrangement of the car with the motorneer's apartment in the forward end. Fig. 3 is an elevation of the front end of the car showing the radiator very much the same as on an automobile or motor truck. Fig. 4 is a top plan view of the frame or chassis for the car showing the preferred arrangement of the engine and driving transmission with the geared propeller shaft connection to each of the axles. Fig. 5 is a vertical sectional view of the wheels, frame, springs, boxes, casing and brakes, showing the axle in the casing and the central bevel gears thereon for driving the axle. Fig. 6 is a crosswise sectional view of the forward axle and gear casing at line 6—6 in Fig. 5 showing the preferred construction and arrangement of the same. Fig. 7 is an elevation of a bevel gear having spiral teeth. Fig. 8 is a detail of the link connection for the gear shift lever.

Like characters of reference refer to corresponding parts in the several views.

The numeral 10 designates the car body which may be made in any desired design for a traction car. It is preferably made of metal so as to be as rigid and strong as possible.

The numeral 11 designates the frame upon which the main body of the car 10 rests, which frame supports the driving mechanism upon crossbars and is supported upon suitable springs 41 on the axles 29 and 33. The frame 11 has a fender 12 on the front end the same as traction cars. A radiator 13 is attached to the front end of the frame 11 and to the body of the car 10 and is connected by suitable piping 14 to the engine 15. The engine 15 is here shown as a gas engine though the car might be driven by a suitable steam engine in place of the gas engine 15. Immediately in the rear of the engine 15 is a clutch 16 of suitable design for aiding in the control of the car. The clutch 16 is mounted on the main shaft 17 which extends back from the engine 15 to the main shaft drive gear 18, which main shaft 17 has universal joints 19 to render it flexible for curves and undulations.

The main shaft 17 is supported in suitable bearings and has mounted thereon the low and reverse pinions 36 and 37. The low and reverse sliding gears 38 are mounted on a counter shaft 20 parallel with the main shaft 17, which sliding gears 38 are controlled by means of a cross shaft 39 to which are attached the links 40 which connect to the gear shift lever 42 and hand brake lever 43, which levers 42 and 43 extend up into the motorneer's compartment 44 within the car 10. The main shaft 17 has a bevel gear 21 mounted on its rear end which meshes in a bevel gear 22 mounted on the forward axle 29 to turn said axle.

A propeller shaft 24 is supported in suitble bearings and has a bevel gear 23 mounted on its forward end so as to mesh in the bevel driving gear 22 on the axle 29. The propeller shaft 24 has universal joints 25 and 26 which permit the adjustment of said propeller shaft 24 to the necessary changes in curves and undulations. A bevel gear 27 is mounted on the rear end of propeller shaft 24 and meshes in a bevel driving gear 28 on the rear axle 33. The bevel gears may be straight toothed, as shown in Figs. 5 and 6, or spiral toothed, as shown in Fig. 7, without departing from our invention.

The forward axle 29 has the wheels 30 mounted thereon in suitable boxes 39 preferably with roller bearings 40, as shown in Fig. 5, and the rear axle 33 has the wheels 34 preferably mounted as shown in Fig. 5, the boxes 39 being supported on springs 41 at each side. Suitable casings 31 for the forward axle and 32 for the rear axle are provided to protect said axles and gears from dust and dirt, inclosing the bevel gears therein as an oil container for lubrication. The springs 41 support the frame 11 thereon at each side. Said springs 41 may be the full elliptical or half elliptical as desired. Connecting rods 35 are provided one each side of the propeller shaft 24 between the two trucks.

The engine 15 and clutch 16 are mounted in a suitable housing 48, a generator 44 being provided in said housing alongside the engine 15 mounted on a suitable shaft and connected by pulleys and a belt 45 to a suitable shaft upon which is mounted a fan 46 in the rear of the radiator 13, the fan construction and adjustment being much the same as is common in automobiles. The transmission mechanism is housed in a second housing 49 which acts as a container for a lubricant so that said transmission mechanism may have thorough lubrication.

It is apparent that this simple direct drive for a traction car may be controlled the same as an automobile by means of the gear shift lever 42 and hand brake lever 43 and the brakes 50, suitable connections being provided from the brakes 50 to the foot levers 47 in compartment 44 so that the motorneer controls and drives the car the same as a chauffeur in an automobile.

The car 10 and the frame 11 are supported on the forward and rear trucks which trucks are connected by the pivotally attached rods 35, as shown in Fig. 4, for the shorter cars but for long cars are preferably crossed diagonally, as indicated in dotted line in Fig. 4, thereby permitting long cars to easily take curves and thereby forming a strong and yet flexible running frame. The pivotal connection with the spaced trucks permit the parallel braces to slightly yield or spring when turning a curve. The mounting of the wheels on the springs also accommodates for slight relative movement between the trucks.

We claim as new:

1. A railway car comprising a car body, a motor supported by the frame of the body beneath its forward end, spaced two-wheel trucks yieldably supporting the body frame, transmission gearing universally connecting the motor to the axle of the forward truck, and transmission means universally connecting the axles of both trucks.

2. A railway car comprising a car body having a supporting frame, longitudinally spaced pairs of springs on the frame, a single journal box supported by each spring, an axle having its ends journaled in the boxes of each pair of springs, traction wheels on the axles, transmission means connecting the axles, a motor, transmission gearing connecting the motor to one axle, and means within the car for controlling the transmission gearing.

3. In a railway car, forward and rearward axles having supporting traction wheels, a gear fixed on each axle between its wheels a casing inclosing each gear, a universally jointed shaft journaled in the casings and carrying terminal gears in mesh with the first gears, brace rods having pivotal connection at their opposite ends with the forward and rearward axles, and a motor geared to operate one of the axles.

In testimony whereof we have affixed our signatures in the presence of two witnesses.

JOSEPH L. FRICK.
HARRY G. CLEMENGER.

Witnesses:
H. A. SANDBERG,
A. W. LITTLE.